United States Patent [19]

Dodt et al.

[11] Patent Number: 5,351,159
[45] Date of Patent: Sep. 27, 1994

[54] MAGNETIC TAPE CARTRIDGE HAVING MEDIA IDENTIFICATION

[75] Inventors: William C. Dodt, Broomfield; Jerry L. Donze, Arvada; Michael L. Leonhardt, Longmont; Charles A. Milligan, Golden; Hari S. Narahari, Boulder; John C. Owens, Arvada; Kurt W. Pyatt, Boulder, all of Colo.

[73] Assignee: Storage Technology Corporation, Louisville, Colo.

[21] Appl. No.: 899,759

[22] Filed: Jun. 17, 1992

[51] Int. Cl.⁵ .............................................. G11B 23/02
[52] U.S. Cl. .................................................. 360/132
[58] Field of Search .......................... 360/91, 132, 93

[56] References Cited

U.S. PATENT DOCUMENTS

| 4,079,431 | 3/1979 | Marut | 360/132 |
| 4,484,242 | 11/1984 | Kimizuka et al. | 360/132 |
| 4,841,386 | 6/1989 | Schiering | 360/132 |

FOREIGN PATENT DOCUMENTS

| 0066820 | 5/1979 | Japan | 360/132 |
| 0060575 | 4/1982 | Japan | 360/132 |
| 0183676 | 11/1982 | Japan | 360/132 |
| 0231989 | 11/1985 | Japan | 360/132 |
| 0237244 | 10/1988 | Japan | 360/132 |
| 0121176 | 5/1990 | Japan | 360/132 |

Primary Examiner—Thomas E. Denion
Attorney, Agent, or Firm—Duft, Graziano & Forest

[57] ABSTRACT

This magnetic tape cartridge has the same exterior dimensions as a conventional 3480-type magnetic tape cartridge but houses different media. To clearly identify the media contained in the cartridge, a label receiving recess in included on the back of the cartridge. A human readable and machine readable label can be inserted into this recess to identify the media contained in this cartridge. Additional label recesses are provided juxtaposed to the media identification recess and on the top and side of the cartridge to receive user installed labels to uniquely identify the cartridge.

19 Claims, 2 Drawing Sheets

MAGNETIC TAPE CARTRIDGE HAVING MEDIA IDENTIFICATION

FIELD OF THE INVENTION

This invention relates to magnetic recording and, in particular, to a magnetic tape cartridge that includes media identification labeling to denote the media contained within the magnetic tape cartridge.

PROBLEM

One type of helical scan magnetic tape cartridge has exterior dimensions substantially the same as a 3480-type magnetic tape cartridge. However, the magnetic tape in this helical scan cartridge is wound in a clockwise direction around the tape reel, with the recording surface of the magnetic tape facing out, and the magnetic tape exits the cartridge via an opening in the right front corner of the cartridge housing (as viewed from the front). This configuration is the inverse of the standard 3480-type magnetic tape cartridge implementation. A helical scan cartridge drive keying notch is also included on the cartridge housing, in the form of a chamfer or rectangular notch formed into the left front corner of the cartridge housing (as viewed from the front). Located between the opening and the cartridge drive keying notch on the front of the cartridge housing is a plurality of apertures that are used to define the magnetic tape contained in the cartridge. These apertures can be formed in a block of material that is shaped to snap fit and lock in a recess formed in the front of the cartridge housing. The tape drive can then sense the presence and pattern of apertures in the front of the helical scan magnetic tape cartridge when the cartridge is first loaded into the tape drive to ensure that the cartridge is mechanically and electrically compatible with the tape drive.

In addition to these mechanical adaptations of the 3480-type magnetic tape cartridge, a helical scan compatible magnetic tape is loaded in the helical scan magnetic tape cartridge in order to be electrically, magnetically and mechanically compatible with a helical scan tape drive. These adaptations to the 3480-type magnetic tape cartridge enable a helical scan tape drive to be configured such that the helical scan magnetic tape cartridge is loaded into the helical scan tape drive in a manner that is identical to conventional 3480-type tape drives, yet the helical scan magnetic tape cartridge is mechanically differentiable from the 3480-type magnetic tape cartridge by the tape drive.

However, these mechanical differentiations are not easily discerned by an operator when the magnetic tape cartridges are stored in cartridge storage racks. Automated magnetic tape cartridge library systems also cannot distinguish between these helical scan magnetic tape cartridges and 3480-type magnetic tape cartridges. There is presently no mechanism to address this problem of distinguishing among carious types of magnetic tape cartridges and an operator or an automated magnetic tape cartridge library system can load a magnetic tape cartridge in an incompatible cartridge tape drive.

SOLUTION

The above described problems are solved and a technical advance achieved in the field by the magnetic tape cartridge having media identification for use in a helical scan tape drive. This media identification consists of a pair of recesses formed in the back side of the magnetic tape cartridge housing. One recess is substantially rectangular in shape and adapted to receive the standard cartridge label that contains both human readable and machine readable indicia to uniquely identify the magnetic tape cartridge. Another recess, of greater depth than and juxtaposed to the cartridge identification label recess, is also provided on the back side of the magnetic tape cartridge housing. This additional recess is adapted to receive a media identification label, applied by the cartridge manufacturer, to identify in both human readable and machine readable indicia the media contained within the magnetic tape cartridge housing. Both human operators and automated magnetic tape cartridge library systems can therefore distinguish between 3480-type and helical scan type magnetic tape cartridges by reading the indicia on the media identification label.

DETAILED DESCRIPTION

Figure 1:
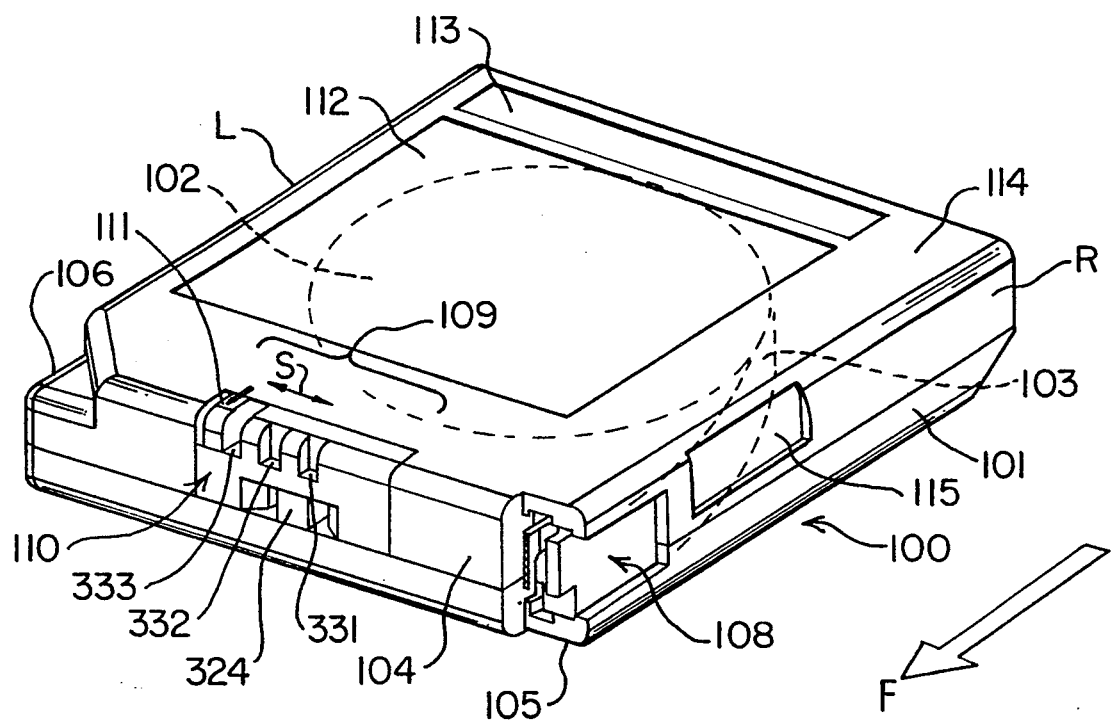
FIG. 1 illustrates, in perspective view, the magnetic tape cartridge of the present invention.
Figure 2:
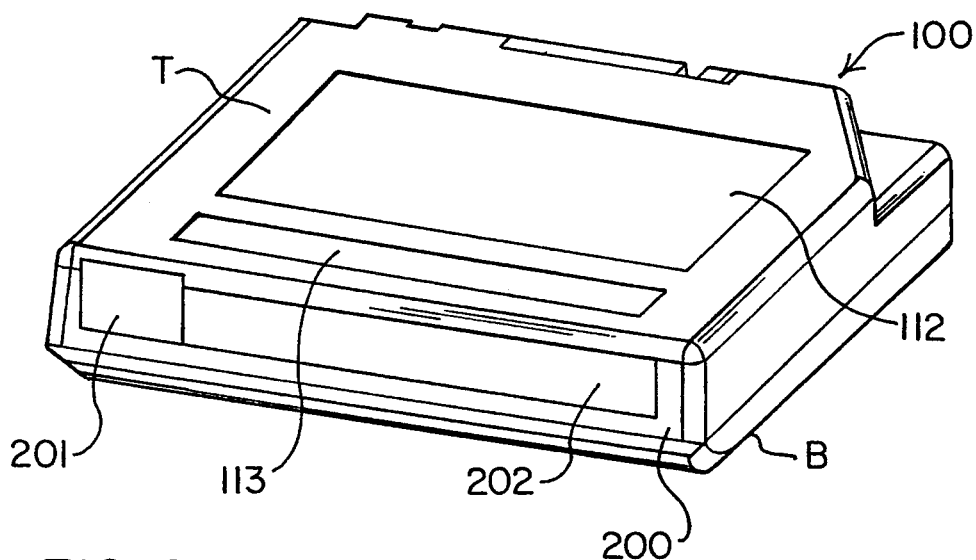
FIGS. 2 and 3 illustrate perspective and end views of the back side of the magnetic tape cartridge of the present invention.
Figure 3:
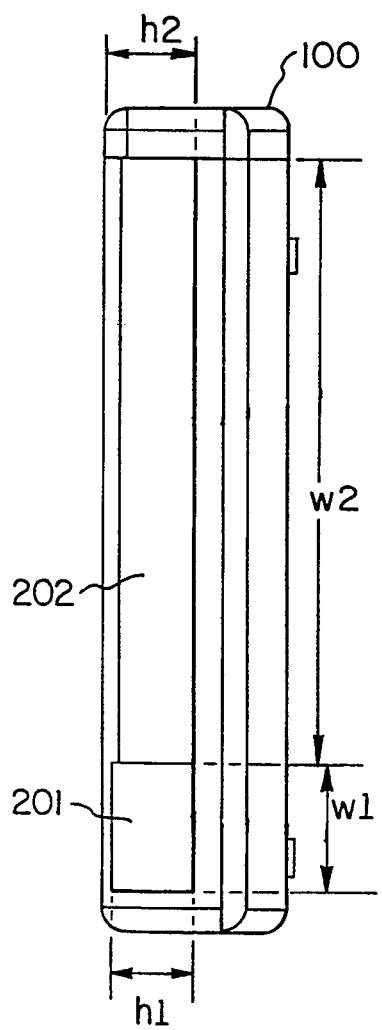

FIG. 1 illustrates a perspective view of the front and FIGS. 2 and 3 illustrate perspective and end views of the back of the helical scan magnetic tape cartridge 100 of the present invention. The helical scan magnetic tape cartridge 100 consists of an exterior housing 101 that has substantially the same exterior dimensions as a conventional 3480-type magnetic tape cartridge. The helical scan magnetic tape cartridge 100 has a front side 104, which includes an opening 105 through which a tape drive accesses the magnetic tape 103 contained therein. The helical scan magnetic tape cartridge 100 is inserted into the tape drive in direction F, front side 104 first. As with the 3480-type magnetic tape cartridge, the helical scan magnetic tape cartridge 100 contains a single supply reel 102 on which the magnetic tape 103 is wound in a clockwise direction. This direction of winding the magnetic tape 103 is the opposite of the conventional 3480-type magnetic tape cartridge. Furthermore, the recording surface of the magnetic tape 103 in the helical scan magnetic tape cartridge 100 faces outward such that when the magnetic tape 103 traverses the tape threading path in a helical scan tape drive, the recording surface of the magnetic tape 103 faces the read/write heads of the helical scan tape drive. A drive spindle (not shown) is attached to the bottom side of tape supply reel 102 to engage the supply reel drive mechanism in the helical scan tape drive as in conventional 3480-type tape drive systems.

As viewed in FIG. 1, the helical scan magnetic tape cartridge 100 includes an opening 105 in the right side of the front 104 of the cartridge housing 101 through which the helical scan tape drive tape threading mechanism accesses the magnetic tape 103. Access to magnetic tape 103 is provided in a manner that is similar to a 3480-type magnetic tape cartridge, with a leader block 108 attached to one end of the magnetic tape 103 that is stored in the helical scan magnetic tape cartridge 100. The orientation, size and shape of the opening 105 in the end of the magnetic tape cartridge 100 can be similar to that used in the 3480-type magnetic tape cartridge, however, this opening 105 is on the opposite corner of the front side 104 of the magnetic tape cartridge housing 101 as that found on the standard 3480-type magnetic tape cartridge. The position of opening 105 on front side 104 of exterior housing 101 mechanically differentiates the helical scan magnetic tape cartridge 100 from the 3480-type magnetic tape cartridge to enable a tape drive to recognize the difference between the helical scan magnetic tape cartridge 100 and the 3480-type magnetic tape cartridge. In order to further mechanically distinguish the helical scan magnetic tape cartridge 100, the right front corner 106 of the front 104 of the exterior housing 101 optionally can also be angled or recessed in order to clearly distinguish this helical scan magnetic tape cartridge 100 from conventional 3480-type magnetic tape cartridges.

Tape Drive Compatibility

By using this configuration, the helical scan magnetic tape cartridge 100 is mechanically compatible with automated magnetic tape cartridge libraries such as the 4400 Automated Cartridge System manufactured by Storage Technology Corporation. Since helical scan type of magnetic tape can not be loaded in conventional 4480 or 3480 tape drives without damaging the magnetic tape during the load operation, the use of this mechanical differentiation described above automatically prevents the helical scan magnetic tape cartridge 100 from threading in a conventional 4480 or 3480 magnetic tape drive since the leader block 108 is positioned on the opposite side of the front 104 of exterior housing 101 of the helical scan magnetic tape cartridge 100. Furthermore, by placing the opening 105 on the opposite corner of exterior housing 101, the helical scan magnetic tape cartridge 100 provides a longer tape threading path in order to accurately emulate a magnetic tape cassette which is conventionally used with a helical scan tape drive. Furthermore, a standard 3480 or 4480 magnetic tape cartridge can not be threaded on a helical scan tape drive since the leader block is on the opposite side from that expected for a helical scan magnetic tape cartridge 100. Thus, the helical scan magnetic tape cartridge 100 allows the use of standard 4400 ACS libraries to store and retrieve both types of magnetic tape cartridges since the exterior dimensions of the helical scan magnetic tape cartridge 100 are identical in the gripping areas to that of the 3480-type magnetic tape cartridge. Helical scan tape drives can be intermixed with conventional 3480 magnetic tape cartridge drives in a 4400 ACS library since both media have the same exterior form factor dimensions and the tape cartridges are not interchangeable therebetween due to the mechanical configuration differences described above with respect to the position of the leader block and the direction and orientation of the magnetic tape as wound the supply reel contained within the magnetic tape cartridge.

Coding Configuration

One additional encoding scheme to identify the media 103 contained within magnetic tape cartridge 100 is the use of physical or optical features on the exterior of housing 101. An example of such features is the use of a pattern of ridges 109 or indentations (such as holes or slots) located on one side 104 of exterior housing 101, which pattern mechanically identifies the media 103 contained within magnetic tape cartridge 100. A corresponding coding detection apparatus, such as a photodetector or a corresponding array of decoding pins, in the tape drive detects the presence and pattern of holes 109 to determine whether the media 103 contained in this magnetic tape cartridge 100 is compatible with the associated tape drive. The presence of an incompatible media 103 aborts the loading process prior to the tape drive attempting to access the media 103 contained within.

Write Inhibit Mark

One of these coding apertures 109, for example the aperture labeled 333 on FIG. 1, is used to indicate the write inhibit status of the magnetic tape 103 contained within helical scan magnetic tape cartridge 100. This write inhibit aperture 333 is settable by the user by means of a slide mechanism 111 that can be positioned to block or open the write protect aperture 333 in the linear array of apertures 109 illustrated in FIG. 1. Thus, the helical scan tape drive determines whether the data records stored on this magnetic tape 103 are write protected by sensing whether write protect aperture 333 is blocked via the use of a photodetector positioned opposite write protect aperture 333 or by use of a sensing pin which probes the front surface 104 of the helical scan magnetic tape cartridge 100 to determine whether the write inhibit aperture 333 is blocked by the slide mechanism 111.

Media Identification

The remaining coding aperture positions, two of which (331, 332) are illustrated as open in FIG. 1, provide a plurality of possible coding configurations, since the presence or absence of an aperture represents a binary data bit. Since the magnetic tape 103 is placed in the helical scan magnetic tape cartridge 100 by the manufacturer during the manufacturing process, the coding apertures 109 are also placed on the front side 104 of the helical scan magnetic tape cartridge 100 during the manufacturing process to reflect the type of magnetic tape 103 located inside of exterior housing 101. Since the 3480-type magnetic tape cartridge form factor lends itself to use with magnetic tape media, there are a number of possible configurations of magnetic tape media that can be used within helical scan magnetic tape cartridge 100. For example, the data recording format used on this magnetic tape 103 can vary from the standard longitudinal data recording format used in present 3480-type tape transports to the helical multitrack format commonly found in video tape. Additional coding information can be provided by use of coding apertures 109 to indicate whether the magnetic tape 103 contained in exterior housing 101 is of a thick or thin dimension and, more specifically, the nominal length of magnetic tape 103 that is provided on reel 102. Since there are a finite number of standard tape lengths, this information represents only a few possible choices and does not preclude too many of the possible coding variations provided by coding apertures 109. Additionally, the type of coating that is used on the magnetic tape 103 is of significance for certain tape transports and coding information can reflect the magnetic coating composition.

The coding apertures 109 can reflect all of the physical characteristics of the magnetic tape 103 that is wound of reel 102 contained within the exterior housing 101 of helical scan magnetic tape cartridge 100. In addition, the data format and content can similarly be reflected by appropriate selection of a pattern of the coding apertures 109. Since the pattern of coding apertures 109 illustrated in FIG. 1 represent but one embodiment of this concept, it is expected that various other configurations of coding apertures 109 are possible for use on the helical scan magnetic tape cartridge 100.

Cartridge Labeling

None of these mechanical differentiations described above assist a user or an automated magnetic tape cartridge library system in distinguishing between helical scan magnetic tape cartridge 100 and a 3480-type magnetic tape cartridge, since only the back of a cartridge can be seen when a cartridge is placed in a cartridge storage location in an automated magnetic tape cartridge library system or in a manual magnetic tape cartridge storage rack or in a cartridge tape drive. Therefore, an additional magnetic tape cartridge identification mechanism, located on the back side of the magnetic tape cartridge exterior housing 101, is required to further differentiate between types of magnetic tape cartridges. FIGS. 2 and 3 illustrate perspective and top views of the back side of helical scan magnetic tape cartridge 100. Included in the back side 200 of helical scan magnetic tape cartridge 100 exterior housing 101 is a first recess 201 and a second recess 202, each adapted to receive labels 500, 400 for cartridge identification purposes.

The first recess 201 is a substantially rectangular recess located at one end of the back side 200 of helical scan magnetic tape cartridge 100 exterior housing 101 and adapted to receive a media identification label 500, preferably applied by the manufacturer of the helical scan magnetic tape cartridge 100, which label 500 contains human readable 560, 570 and machine readable 540, 560 indicia indicative of the media (magnetic tape 103) contained within helical scan magnetic tape cartridge 100. Juxtaposed to first recess 201 is substantially rectangular second recess 202 which extends from one end of first recess 201 to the other end of the long dimension of back side 200 of helical scan magnetic tape cartridge 100. Second recess 202 is adapted to receive a cartridge identification label 400 applied thereto by the user of the helical scan magnetic tape cartridge 100 to uniquely identify cartridge 100. As can be seen from FIG. 3, the height h1 of first recess 201 is slightly different than the height h2 of second recess 202 wherein height is defined as the dimension between top side T and bottom side B of helical scan magnetic tape cartridge 100 exterior housing 101. In addition, to further differentiate first recess 201 from second recess 202, first recess 201 is formed different depth into back side 200 of exterior housing 101 than second recess 202. First recess 201 is typically formed at least twice as deep/or shallow into the back side 200 of exterior housing 101 as is second recess 202. As can be seen from FIGS. 2 and 3, the edge of both first recess 201 and second recess 202 closest to the bottom side B of helical scan magnetic tape cartridge 100 are aligned to be substantially in line with each other.

The dimensions and placement of first recess 201 and second recess 202 are such that first recess 201 is easily mechanically differentiable from second recess 202 and of dimensions (h1 * w1) sufficient to receive a media identification label 500 of extent great enough to contain human readable and machine readable indicia thereon which indicia define the magnetic tape 103 contained within helical scan magnetic tape cartridge 100. Second recess 202 is of physical dimensions (h2 * w2) such that it receives a cartridge identification label 400 containing human readable and machine readable indicia that uniquely identify helical scan magnetic tape cartridge 100. A typical label configuration for the cartridge identification label 400 inserted into second recess 202 consists of a label 400 containing two parallel columns 401, 402 of indicia wherein the columns 401, 402 extend along the long dimension (w2) of the cartridge identification label 400. One column 401 of the cartridge identification label 400 contains human readable indicia 42* while the adjacent column 402 contains machine readable indicia, which machine and human readable indicia are redundant for reliability purposes. This cartridge identification label 400 typically contains six characters of indicia.

Machine-Readable VOLSER Label

Figure 4:
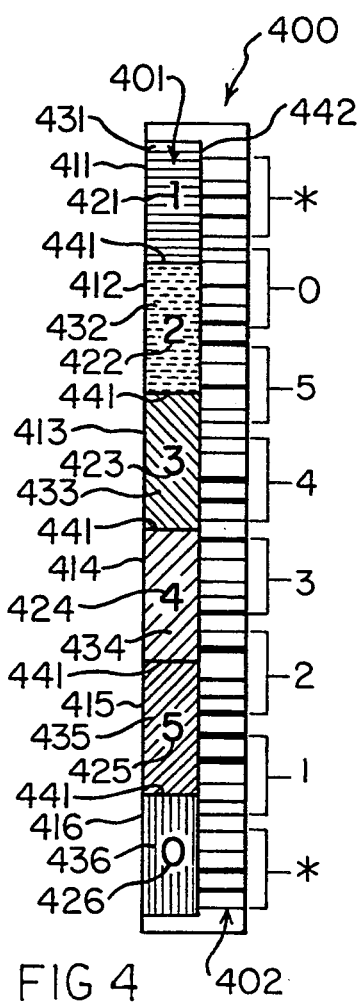
FIG. 4 illustrates a cartridge identification label.

FIG. 4 illustrates a typical cartridge identification label 400 that can be used in second recess 202 on the back side 200 of exterior housing to uniquely identify helical scan magnetic tape cartridge 100. The cartridge identification label 400 incorporates a volume identification (VOLSER) imprinted thereon in both machine readable and human readable form. The first vertical column 401 of characters imprinted on the cartridge identification label 400 is divided into a series of vertically aligned, rectangular segments 411–416 each of which can be separated from a contiguous other by a printing trap comprising a solid line 441. The rectangular segments 411–416 can also be separated from a second vertically aligned column 402 of characters adjacent to and coextensive with the first vertical column 401 of characters by another printing trap 442 comprising a solid line. One character 421–426 of a machine-readable and human-readable code is located within each rectangular segment 411–416 in the first column 401 of characters thereby forming a message in a first code. The second vertical column 402 contains a single rectangular segment containing a string of characters in a machine-readable code such as a bar code. This string of characters in the second vertical column 402 comprises a message in a second code which is identical to the message formed in the first vertical column 401 in the machine-readable and human-readable code. In addition, the background 431–436 of each of the rectangular segments 411–416 contained within the first vertical column 401 are suitably color coded to correspond to the respective characters 421–426 of machine-readable and human-readable code contained therein, thereby providing a message in a third code which is identical to the above-described messages of the first and second codes.

The two vertical columns 401, 402 of characters imprinted with the first and second codes are so arranged for redundancy purposes. The message (1, 2, 3, 4, 5, 0) in the first vertical column 401 is printed to be read downwardly from top to bottom while the bar code (*, 1, 2, 3, 4, 5, 0, *) in the second vertical column 402 is printed to be machine readable upwardly in the reverse direction. In this manner, the cartridge identification label 400 may be used to accurately and uniquely identify a magnetic tape cartridge 100 in spite of the absence of a portion of the cartridge identification label 400. For example, if the bottom segment of the cartridge identification label 400 were missing, a user or an automated magnetic tape cartridge library system would be able to read the first portion of the first code and the last portion of the second code. By combining these two readable segments of the first and second codes, the complete code on the cartridge identification label 400 can therefore be reconstructed.

Media Identification Label

Figure 5:
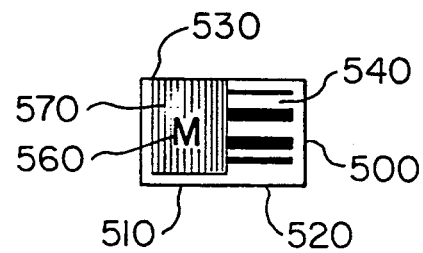
FIG. 5 illustrates a media identification label.

FIG. 5 also illustrates a typical media identification label 500 that can be placed in first recess 201 on the back side 200 of exterior housing 101 of helical scan magnetic tape cartridge 100. The media identification label 500 incorporates indicia printed in both machine readable and human readable form to identify the media contained within helical scan magnetic tape cartridge 100. The first vertical column 510 of characters imprinted on media identification label 500 comprises at least one vertically aligned, rectangular segment 530 that can be separated from a second vertically aligned column 520 of characters adjacent to and coextensive with the first vertical column 510 of characters by a line of predetermined width. One character 560 of a human-readable code is located within each rectangular segment 530 in the first column 510 of characters thereby forming a message in a first code. The second vertical column 520 contains a single rectangular segment containing a string of characters in a machine-readable code, such as a bar code. This string of characters in the second vertical column 520 comprises a message in a second code which is identical to the message formed in the first vertical column 510 in the human-readable code. In addition, the background 570 of each of the rectangular segments 530 contained within the first vertical column 510 can be suitably color coded to correspond to the respective characters 560 of human-readable code contained therein, thereby providing a message in a third code which is identical to the above-described messages of the first and second codes.

The two vertical columns 510, 520 of characters imprinted with the first and second codes are so arranged for redundancy purposes. The message (M) in the first vertical column 510 is printed to be read downward (direction A) from the top (T) to bottom (B) of label 500 and the digits of the bar code in the second vertical column 520 are printed to be machine-readable downward in the same direction. The right hand column 520 of the media identification label 500 contains information inclusive of that printed in the left hand column 510 of the media identification label 500 as well additional information in the form of synchronization codes.

Furthermore, third 112, fourth 113 and fifth 115 recesses are provided on the top T and right side R of helical scan magnetic tape cartridge 100 to provide additional labeling areas that can be used by the user and/or the manufacturer to uniquely define helical scan magnetic tape cartridge 100 and its contents. The third recess 112 is substantially square in dimensions and is adapted to receive a media identification label (now shown) installed thereon by a manufacturer to identify the manufacturer of helical scan magnetic tape cartridge 100 and the type of magnetic tape 103 contained therein. The fourth recess 113 is substantially rectangular in shape and can substantially match the dimensions of second recess 202 located on the back side of helical scan magnetic tape cartridge 100. Fourth recess 113 is adapted to receive a cartridge identification label (not shown) installed thereon by the user to uniquely identify helical scan magnetic tape cartridge 100 as was the case with the cartridge identification label 400 inserted into second recess 202. Third, fourth and fifth recesses 112, 113 and 115 are substantially the same depth into top side 114 of exterior housing 101 of helical scan magnetic tape cartridge 100. The fifth recess 115 is substantially rectangular in shape and is located on either or both of left side L and right side R of exterior housing 101. Fifth recess 115 is adapted to receive a cartridge identification label (not shown) installed thereon by the user to uniquely identify magnetic tape cartridge 100 for a different cartridge orientation, in perhaps a storage rack.

SUMMARY

The helical scan magnetic tape cartridge 100 is mechanically identifiable to a tape drive and visually identifiable to an operator by the placement of the opening 105 in a corner of exterior housing 101 that is the opposite of that used for 3480-type magnetic tape cartridges. Further mechanically and visually distinguishable marks are the plurality of apertures 109 formed in the front side 104 of exterior housing 101 as well as the use of a notch 106 placed in a corner opposite that of opening 105 in the front side 104 of exterior housing 101. The back side 200 of exterior housing 101 is equipped with two recesses each adapted to receive a label containing human readable and machine readable indicia. One label 500 identifies the media contained within magnetic tape cartridge 100 while the other label 400 uniquely identifies magnetic tape cartridge 100. This configuration of distinguishing features mechanically and visually distinguish the helical scan magnetic tape cartridge 100 from conventional 3480-type magnetic tape cartridges.

While a specific embodiment of this invention has been disclosed, it is expected that those skilled in the art can and will design alternate embodiments of this invention that fall within the scope of the appended claims.

We claim:

1. A magnetic tape cartridge comprising:
   an exterior housing having a top side, a bottom side, a back side and a front side thereto for enclosing a single reel of magnetic tape;
   first recess means of predetermined dimensions located on said back side of said exterior housing for receiving a label identifying data storage characteristics of said magnetic tape;
   second recess means of predetermined dimensions, located on said back side of said exterior housing juxtaposed to said first recess means, for receiving a label identifying said magnetic tape cartridge; and
   means, mechanically imprinted into said front side of said exterior housing for defining data storage characteristics of said magnetic tape.

2. The magnetic tape cartridge of claim 1 wherein said exterior housing has the exterior dimensions of a 3480-type magnetic tape cartridge.

3. The magnetic tape cartridge of claim 1 wherein said first recess means is substantially rectangular in shape.

4. The magnetic tape cartridge of claim 1 wherein said first recess means is formed of different depth into said back side of said exterior housing than said second recess means.

5. The magnetic tape cartridge of claim 1 wherein said second recess means is substantially rectangular in shape.

6. The magnetic tape cartridge of claim 1 wherein said first recess means is formed to be different in height from said top side of said exterior housing to said bottom side of said exterior housing than said second recess means.

7. The magnetic tape cartridge of claim 1 further comprising:
   third recess means of predetermined dimensions located on said top side of said exterior housing for receiving a label identifying data storage characteristics of said magnetic tape.

8. The magnetic tape cartridge of claim 7 further comprising:
fourth recess means of predetermined dimensions located on said top side of said exterior housing for receiving a label identifying said magnetic tape cartridge.

9. The magnetic tape cartridge of claim 1 wherein said defining means comprises:
a plurality of coding apertures located on said front side of said exterior housing.

10. The magnetic tape cartridge of claim 1, wherein said exterior housing has a right side and a left side, further comprising:
side recess means of predetermined dimensions, located on at least one of said right side and said left side, for receiving a label identifying said magnetic tape cartridge.

11. A magnetic tape cartridge containing a single reel of magnetic tape, said magnetic tape cartridge being received into a tape drive unit for reading/writing data on said magnetic tape, comprising:
housing means, being substantially rectangular in shape and having a front side, a back side, a top side and a bottom side thereto;
first recess means of predetermined dimensions located on said back side of said housing means;
second recess means of predetermined dimensions located on said back side of said housing means and juxtaposed to said first recess means for receiving a label identifying said magnetic tape cartridge;
label means, inserted into said first recess means, for identifying data storage characteristics of said magnetic tape; and
means, mechanically imprinted into said front side of said exterior housing for defining data storage characteristics of said magnetic tape.

12. The magnetic tape cartridge of claim 11 wherein said first recess means is substantially rectangular in shape.

13. The magnetic tape cartridge of claim 11 wherein said first recess means is formed of different depth into said back side of said housing means than said second recess means.

14. The magnetic tape cartridge of claim 11 wherein said second recess means is substantially rectangular in shape.

15. The magnetic tape cartridge of claim 11 wherein said first recess means is formed to be different in height from said top side of said housing means to said bottom side of said housing means than said second recess means.

16. The magnetic tape cartridge of claim 11 further comprising:
third recess means of predetermined dimensions located on said top side of said housing means for receiving a label identifying data storage characteristics of said magnetic tape.

17. The magnetic tape cartridge of claim 16 further comprising:
fourth recess means of predetermined dimensions located on said top side of said housing means for receiving a label identifying said magnetic tape cartridge.

18. The magnetic tape cartridge of claim 11 wherein said defining means comprises:
a plurality of coding apertures located on said front side of said housing means.

19. The magnetic tape cartridge of claim 11, wherein said housing means has a right side and a left side, further comprising:
side recess means of predetermined dimensions, located on at least one of said right side and said left side, for receiving a label identifying said magnetic tape cartridge.

* * * * *